US010453212B2

(12) United States Patent
Liu

(10) Patent No.: US 10,453,212 B2
(45) Date of Patent: Oct. 22, 2019

(54) WIRELESS TRANSMITTING/RECEIVING SYSTEM, WIRELESS RECEIVING DEVICE AND WIRELESS TRANSMITTING/RECEIVING METHOD

(71) Applicant: VIVOTEK INC., New Taipei (TW)

(72) Inventor: Cheng-Chieh Liu, New Taipei (TW)

(73) Assignee: VIVOTEK INC., New Taipei (TW)

( * ) Notice: Subject to any disclaimer, the term of this patent is extended or adjusted under 35 U.S.C. 154(b) by 86 days.

(21) Appl. No.: 15/603,411

(22) Filed: May 23, 2017

(65) Prior Publication Data
US 2018/0005404 A1  Jan. 4, 2018

(30) Foreign Application Priority Data
Jul. 1, 2016  (TW) .............................. 105120893 A

(51) Int. Cl.
*G06T 7/00* (2017.01)
*G06T 7/70* (2017.01)
(Continued)

(52) U.S. Cl.
CPC ............... *G06T 7/70* (2017.01); *G01S 3/781* (2013.01); *G01S 3/783* (2013.01); *G01S 3/801* (2013.01);
(Continued)

(58) Field of Classification Search
None
See application file for complete search history.

(56) References Cited

U.S. PATENT DOCUMENTS 8,744,391 B2 * 6/2014 Tenbrook .............. H04W 48/16
455/226.2
2008/0205703 A1   8/2008 Brown
(Continued)

FOREIGN PATENT DOCUMENTS

WO       2016079911 A1    5/2016
WO    WO-2017072810 A1 *  5/2017 ............. G08B 21/02

OTHER PUBLICATIONS

C.H. Chen, Y. C. Chang, T.Y. Chen, and D.J. Wang, People Counting System for Getting In/Out of a Bus Based on Video Processing, Intelligent Systems Design and Applications, Nov. 26-28, 2008, pp. 565-569, IEEE, Kaohsiung, Taiwan.
(Continued)

*Primary Examiner* — Delomia L Gilliard
(74) *Attorney, Agent, or Firm* — Winston Hsu

(57) ABSTRACT

A wireless transmitting/receiving system includes a transmitter, a first directional receiver, a camera, a storage device and a processor. The transmitter is disposed on a target object and transmits a wireless signal. The first directional receiver is disposed with respect to an entry/exit boundary. The first directional receiver receives the wireless signal and generates a first received signal strength indication. The camera captures an image of the entry/exit boundary. The storage device stores a mapping table of target object location and received signal strength. The processor is electrically connected to the storage device and determines a location of the target object and a moving direction of the target object with respect to the entry/exit boundary according to the image and the mapping table of target object location and received signal strength.

16 Claims, 12 Drawing Sheets

(51) Int. Cl.

| | |
|---|---|
| *G01S 3/781* | (2006.01) |
| *G01S 3/783* | (2006.01) |
| *G01S 3/801* | (2006.01) |
| *G01S 3/803* | (2006.01) |
| *G01S 5/18* | (2006.01) |
| *G06T 7/20* | (2017.01) |
| *G01S 5/02* | (2010.01) |
| *G01S 5/16* | (2006.01) |

(52) U.S. Cl.
CPC .......... *G01S 3/8032* (2013.01); *G01S 5/0252* (2013.01); *G01S 5/0263* (2013.01); *G01S 5/0284* (2013.01); *G01S 5/18* (2013.01); *G06T 7/20* (2013.01); *G01S 5/16* (2013.01)

(56) References Cited

U.S. PATENT DOCUMENTS

| | | | |
|---|---|---|---|
| 2011/0018769 A1* | 1/2011 | Misikangas | G01S 5/0072 342/451 |
| 2011/0133987 A1 | 6/2011 | Bernsten | |
| 2013/0030931 A1* | 1/2013 | Moshfeghi | G01S 19/48 705/16 |
| 2013/0084801 A1* | 4/2013 | Royston | G06K 7/015 455/41.1 |
| 2015/0094089 A1* | 4/2015 | Moeglein | H04W 4/029 455/456.1 |
| 2016/0148025 A1* | 5/2016 | Ohashi | G06K 7/10128 340/10.1 |
| 2017/0156119 A1* | 6/2017 | Neves | H04W 52/283 |

OTHER PUBLICATIONS

F. Chen and E. Zhang, A Fast and Robust People Counting Method in Video Surveillance, International Conference on Computational Intelligence and Security, Dec. 15-19, 2007, pp. 339-343, IEEE, Beijing, China.

* cited by examiner

WIRELESS TRANSMITTING/RECEIVING SYSTEM, WIRELESS RECEIVING DEVICE AND WIRELESS TRANSMITTING/RECEIVING METHOD

BACKGROUND OF THE INVENTION

1. Field of the Invention

The invention relates to a wireless transmitting/receiving system, a wireless receiving device and a wireless transmitting/receiving method and, more particularly, to a wireless transmitting/receiving system, a wireless receiving device and a wireless transmitting/receiving method using a directional receiver to determine a moving direction of an object.

2. Description of the Prior Art

A system, which counts the number of persons automatically by analyzing a video content, is now in widespread use. For a common store, to calculate accurate number of customers, it usually has to distinguish an employee and a customer from each other. A conventional solution is to dispose a transmitter on the employee, estimates a location of the employee by an indoor positioning manner or a proximity detection manner, and combines the location of the employee with analyzed video data, so as to count the number of employees and customers separately. The aforesaid manner usually needs to use a plurality of receivers and cooperates with trilateration principle, so as to estimate the location of the transmitter. However, since it needs to install lots of receivers, it will increase the cost of installation and maintenance. Furthermore, if the receivers get too close to each other, the accuracy will reduce.

SUMMARY OF THE INVENTION

An objective of the invention is to provide a wireless transmitting/receiving system, a wireless receiving device and a wireless transmitting/receiving method using a directional receiver to determine a moving direction of an object, so as to solve the aforesaid problems.

According to an embodiment of the invention, a wireless transmitting/receiving system comprises a transmitter, a first directional receiver, a camera, a storage device and a processor. The transmitter is disposed on a target object and the transmitter transmits a wireless signal. The first directional receiver is disposed with respect to an entry/exit boundary. The first directional receiver receives the wireless signal and generates a first received signal strength indication. The camera captures an image of the entry/exit boundary. The storage device stores a mapping table of target object location and received signal strength. The processor is electrically connected to the storage device. The processor determines a location of the target object and a moving direction of the target object with respect to the entry/exit boundary according to the image and the mapping table of target object location and received signal strength.

According to another embodiment of the invention, a wireless receiving device is disposed with respect to an entry/exit boundary and the wireless receiving device cooperates with a transmitter. The transmitter is disposed on a target object and the transmitter transmits a wireless signal. The wireless receiving device comprises a first directional receiver, a camera, a storage device and a processor. The first directional receiver receives the wireless signal and generates a first received signal strength indication. The camera captures an image of the entry/exit boundary. The storage device stores a mapping table of target object location and received signal strength. The processor is electrically connected to the storage device. The processor determines a location of the target object and a moving direction of the target object with respect to the entry/exit boundary according to the image and the mapping table of target object location and received signal strength.

According to another embodiment of the invention, a wireless transmitting/receiving method comprises steps of transmitting a wireless signal by a transmitter, wherein the transmitter is disposed on a target object; receiving the wireless signal and generating a first received signal strength indication by a first directional receiver, wherein the first directional receiver is disposed with respect to an entry/exit boundary; capturing an image of the entry/exit boundary by a camera; and determining a location of the target object and a moving direction of the target object with respect to the entry/exit boundary according to the image and a mapping table of target object location and received signal strength by a processor.

As mentioned in the above, the invention uses the directional receiver to receive the wireless signal transmitted by the transmitter and then determines the moving direction of the target object with respect to the entry/exit boundary according to the variation of the received signal strength indication. In practical applications, the invention may integrate the directional receiver and the camera into the wireless receiving device, dispose the wireless receiving device above the entry/exit boundary, and dispose the transmitter on an employee. Then, the camera may obtain an accumulated number of entry objects and/or an accumulated number of exit objects according to video analysis. Then, the wireless receiving device may know that the employee goes inside or outside with respect to the entry/exit boundary according to the moving direction of the employee, so as to modify the accumulated number of entry objects and/or the accumulated number of exit objects. Accordingly, the invention may filter out the employee, so as to calculate accurate number of customers. Since the invention may use one single directional receiver to determine the moving direction of the object, the invention may reduce the cost of installation and maintenance effectively. Furthermore, the invention may use two directional receivers cooperating with each other to further enhance the accuracy of determining the moving direction of the target object with respect to the entry/exit boundary. Still further, the invention may measure a plurality of received signal strength indications received by the directional receiver when the object with the transmitter is located at a plurality of different locations by experiment in advance and establish a mapping table. Then, after the camera captures the image of the object and determines the location of the object, the invention may use the mapping table to find out a deserved received signal strength indication of the directional receiver corresponding to the location of the object and then calculate a difference between the deserved received signal strength indication and a real received signal strength indication. Then, the invention may determine that an object with the lowest difference is the target object after repeating the aforesaid calculation for several times.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
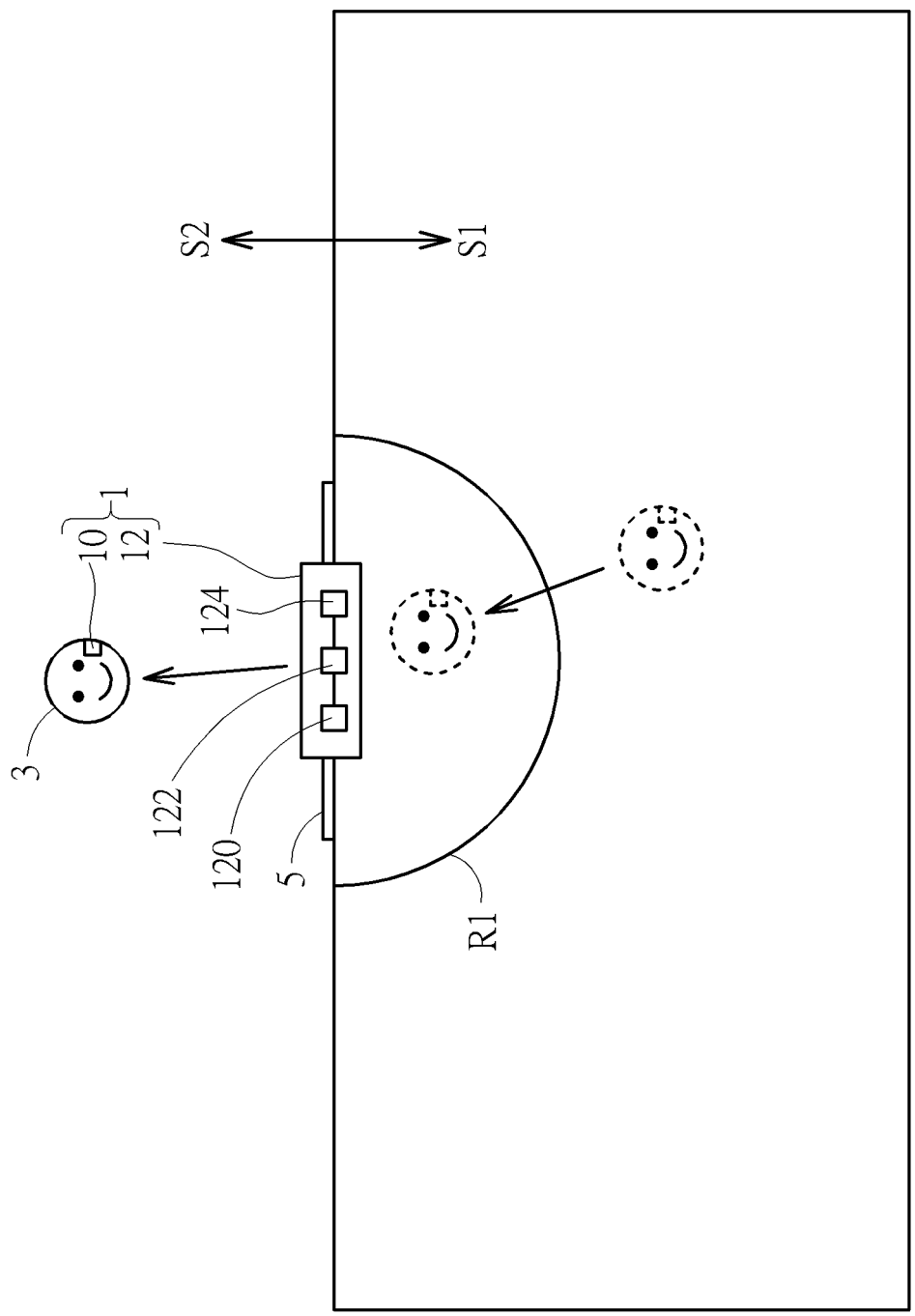
FIG. 1 is a schematic diagram illustrating a wireless transmitting/receiving system according to an embodiment of the invention, wherein a moving direction of a target object is to move from a first side of an entry/exit boundary towards a second side of the entry/exit boundary.
Figure 2:
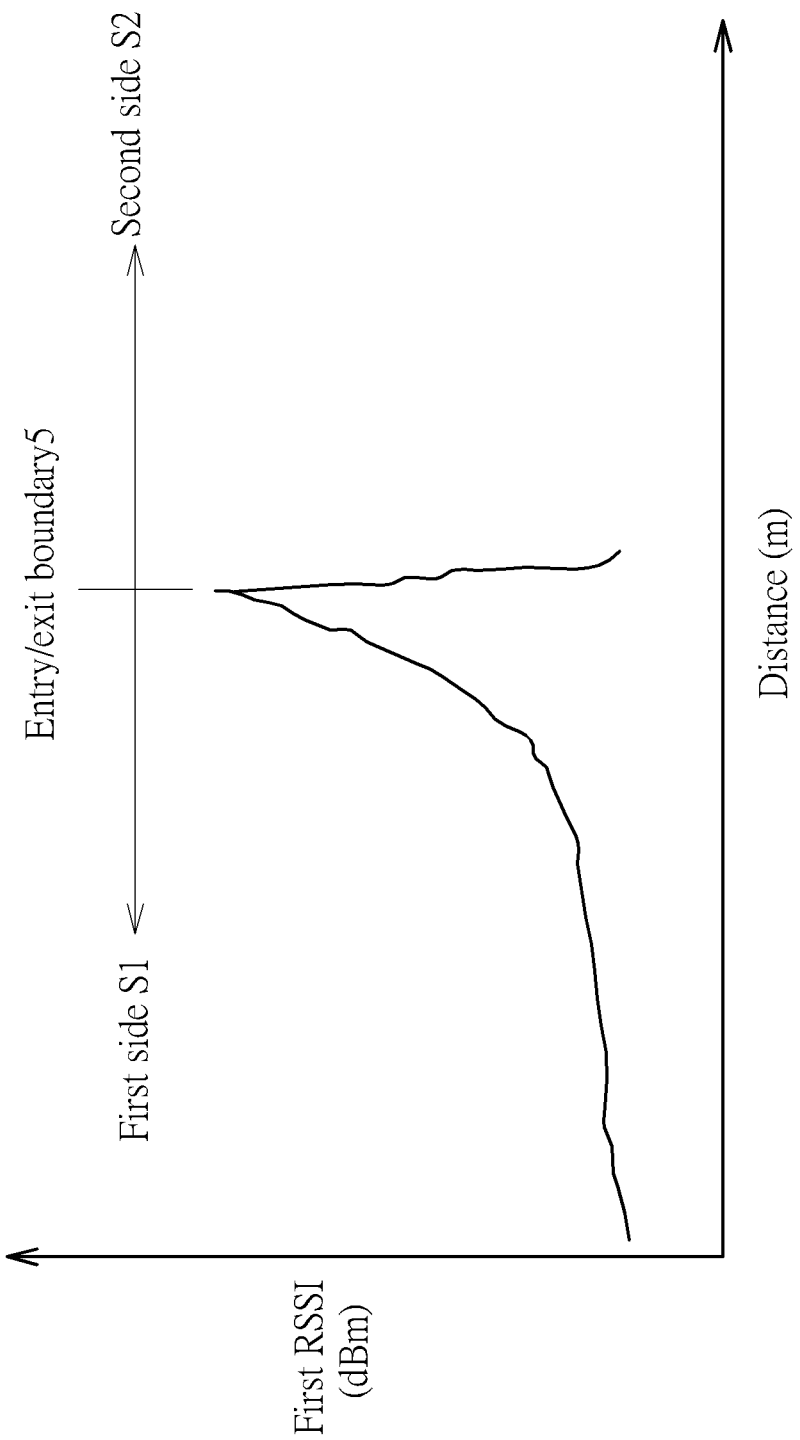
FIG. 2 is a diagram illustrating a relation between first received signal strength indications generated by the first directional receiver shown in FIG. 1 and distances.
Figure 3:
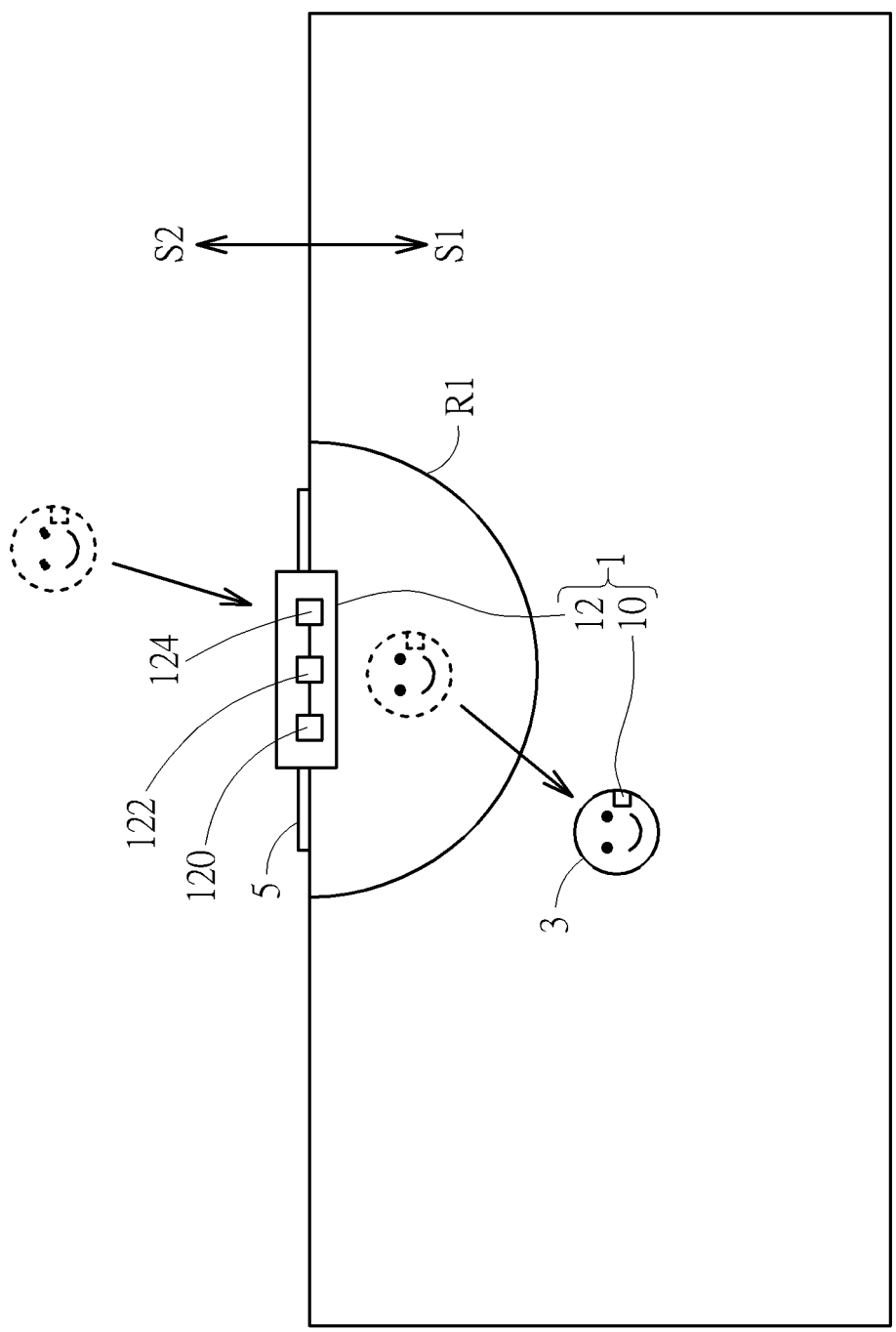
FIG. 3 is a schematic diagram illustrating that a moving direction of the target object shown in FIG. 1 is to move from the second side of the entry/exit boundary towards the first side of the entry/exit boundary.
Figure 4:
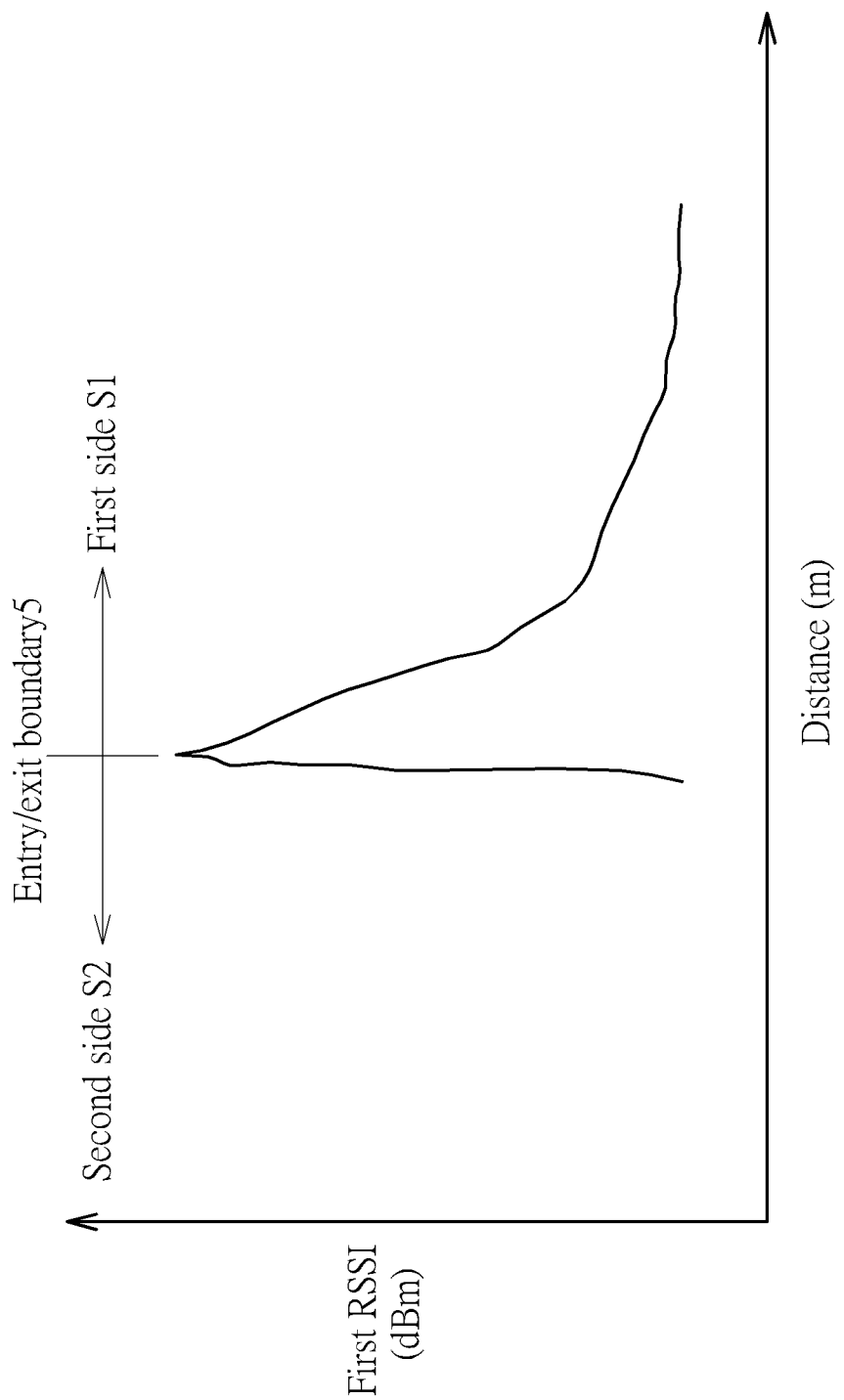
FIG. 4 is a diagram illustrating a relation between first received signal strength indications generated by the first directional receiver shown in FIG. 3 and distances.

Referring to FIGS. 1 to 4, FIG. 1 is a schematic diagram illustrating a wireless transmitting/receiving system 1 according to an embodiment of the invention, wherein a moving direction of a target object 3 is to move from a first side S1 of an entry/exit boundary 5 towards a second side S2 of the entry/exit boundary 5, FIG. 2 is a diagram illustrating a relation between first received signal strength indications generated by the first directional receiver 120 shown in FIG. 1 and distances, FIG. 3 is a schematic diagram illustrating that a moving direction of the target object 3 shown in FIG. 1 is to move from the second side S2 of the entry/exit boundary 5 towards the first side S1 of the entry/exit boundary 5, and FIG. 4 is a diagram illustrating a relation between first received signal strength indications generated by the first directional receiver 120 shown in FIG. 3 and distances.

As shown in FIG. 1, the wireless transmitting/receiving system 1 comprises a transmitter 10 and a wireless receiving device 12, wherein the wireless receiving device 12 cooperates with the transmitter 10 to determine a moving direction of a target object 3 with respect to an entry/exit boundary 5. In this embodiment, the target object 3 may be a person, an animal or other objects, and the entry/exit boundary 5 may be a door or other boundaries. The wireless receiving device 12 comprises a first directional receiver 120, a processor 122 and a camera 124, wherein the processor 122 is electrically connected to the first directional receiver 120 and the camera 124. In other words, the invention may integrate the first directional receiver 120, the processor 122 and the camera 124 into the wireless receiving device 12. However, in another embodiment, the invention may dispose the first directional receiver 120, the processor 122 and the camera 124 separately. For example, the invention may dispose the processor 122 in a remote server (not shown) and the remote server may receive signals transmitted from the first directional receiver 120 and the camera 124 to process and calculate the signals.

The transmitter 10 is disposed on the target object 3 and the transmitter 10 transmits a wireless signal. If the wireless signal transmitted by the transmitter 10 is an ultrasound signal, the first directional receiver 120 may be a directional microphone. If the wireless signal transmitted by the transmitter 10 is an electromagnetic wave signal, the first directional receiver 120 may be a directional antenna. The wireless receiving device 12 is disposed with respect to the entry/exit boundary 5. In other words, the first directional receiver 120 and the camera 124 are also disposed with respect to the entry/exit boundary 5. For example, the wireless receiving device 12 may be disposed above the entry/exit boundary 5, but is not so limited.

In this embodiment, the first directional receiver 120 may receive the wireless signal transmitted by the transmitter 10 and generate a first received signal strength indication (RSSI) continuously. Then, when the target object 3 moves with respect to the entry/exit boundary 5, the processor 122 may determine a moving direction of the target object 3 with respect to the entry/exit boundary 5 according to a variation of the first received signal strength indication.

As shown in FIG. 1, a first receiving range R1 of the first directional receiver 120 is oriented towards a first side S1 of the entry/exit boundary 5. When the moving direction of the target object 3 is to move from the first side S1 of the entry/exit boundary 5 towards a second side S2 of the entry/exit boundary 5 (e.g. move from inside towards outside), the relation between first received signal strength indications generated by the first directional receiver 120 and distances is shown in FIG. 2, wherein the first side S1 of the entry/exit boundary 5 is opposite to the second side S2 of the entry/exit boundary 5. When the target object 3 gets close to the entry/exit boundary 5 gradually from the first side S1 of the entry/exit boundary 5, the first received signal strength indication increases gradually. When the target object 3 passes through the entry/exit boundary 5, the first received signal strength indication decreases rapidly. In other words, when the moving direction of the target object 3 is to move from the first side S1 of the entry/exit boundary 5 towards the second side S2 of the entry/exit boundary 5, the first received signal strength indication increases gradually first and then decreases rapidly. For example, the first received signal strength indication may increase with a first speed (e.g. increase with 1 dBm per second) and then decrease with a second speed (e.g. decrease with 2 dBm per second) larger than the first speed. In an embodiment, the aforesaid second speed may be at least twice the aforesaid first speed.

On the other hand, as shown in FIG. 3, when the moving direction of the target object 3 is to move from the second side S2 of the entry/exit boundary 5 towards the first side S1 of the entry/exit boundary 5 (e.g. move from outside towards inside), the relation between first received signal strength indications generated by the first directional receiver 120 and distances is shown in FIG. 4. When the target object 3 is about to pass through the entry/exit boundary 5 from the second side S2 of the entry/exit boundary 5, the first received signal strength indication increases rapidly. When the target object 3 gets away from the entry/exit boundary 5 gradually from the first side S1 of the entry/exit boundary 5, the first received signal strength indication decreases gradually. In other words, when the moving direction of the target object 3 is to move from the second side S2 of the entry/exit boundary 5 towards the first side S1 of the entry/exit boundary 5, the first received signal strength indication increases rapidly first and then decreases gradually. For example, the first received signal strength indication may increase with a third speed (e.g. increase with 2 dBm per second) and then decrease with a fourth speed (e.g. decrease with 1 dBm per second) smaller than the third speed. In an embodiment, the aforesaid third speed may be at least twice the aforesaid fourth speed.

Accordingly, the processor 122 may determine that the target object 3 moves from the first side S1 of the entry/exit boundary 5 towards the second side S2 of the entry/exit boundary 5 (as shown in FIG. 1) when the first received signal strength indication increases gradually first and then decreases rapidly (as shown in FIG. 2). On the other hand, the processor 122 may determine that the target object 3 moves from the second side S2 of the entry/exit boundary 5 towards the first side S1 of the entry/exit boundary 5 (as shown in FIG. 3) when the first received signal strength indication increases rapidly first and then decreases gradually (as shown in FIG. 4).

By means of the variation of the aforesaid first received signal strength indication, the processor 122 may determine the moving direction of the target object 3 with respect to the entry/exit boundary 5 easily.

In this embodiment, the camera 124 may capture an image of the entry/exit boundary 5 and the processor 122 may analyze the image to obtain an accumulated number of entry objects and/or an accumulated number of exit objects. The accumulated number of entry objects may be defined as the total number of objects who moves from the second side S2 of the entry/exit boundary 5 towards the first side S1 of the entry/exit boundary 5 and passes across the entry/exit boundary 5, and the accumulated number of exit objects may be defined as the total number of objects who moves from the first side S1 of the entry/exit boundary 5 to the second side S2 of the entry/exit boundary 5 and passes across the entry/exit boundary 5. It should be noted that the accumulated number of entry objects comprises the target object 3 shown in FIG. 1 and the accumulated number of exit objects comprises the target object 3 shown in FIG. 3.

Furthermore, how to analyze the image to obtain the accumulated number of entry objects and/or the accumulated number of exit objects is well known by one skilled in the art and it may refer to "C. H. Chen, Y, C. Chang, T. Y. Chen, and D. J. Wang, "People Counting System for Getting In/Out of a Bus Based on Video Processing," Intelligent Systems Design and Applications, 2008. ISDA '08. Eighth International Conference on, vol. 3, pp. 565-569, 2008" and "F. Chen and E. Zhang. A Fast and Robust People Counting Method in Video Surveillance. IEEE International Conference on Computational Intelligence and Security, pages 339-343, 2007", so it will not be depicted in detail herein.

As mentioned in the above, the processor may determine the moving direction of the target object 3 with respect to the entry/exit boundary 5 according to the variation of the first received signal strength indication. Therefore, if the target object 3 should not be counted into the accumulated number of entry objects and/or the accumulated number of exit objects, the processor 122 may modify the accumulated number of entry objects and/or the accumulated number of exit objects according to the moving direction of the target object 3 with respect to the entry/exit boundary 5. For example, since the target object 3 shown in FIG. 1 moves from the first side S1 of the entry/exit boundary 5 towards the second side S2 of the entry/exit boundary 5 and passes across the entry/exit boundary 5, the processor 122 may subtract one from the accumulated number of exit objects, so as to obtain the modified accumulated number of exit objects. Similarly, since the target object 3 shown in FIG. 3 moves from the second side S2 of the entry/exit boundary 5 towards the first side S1 of the entry/exit boundary 5 and passes across the entry/exit boundary 5, the processor 122 may subtract one from the accumulated number of entry objects, so as to obtain the modified accumulated number of entry objects.

In practical applications, for example, when the invention is applied to a retail store for counting the number of customers, the transmitter 10 may be disposed on an employee. Then, the camera may obtain an accumulated number of entry persons (i.e. the aforesaid accumulated number of entry objects) and/or an accumulated number of exit persons (i.e. the aforesaid accumulated number of exit objects) according to video analysis. Then, the wireless receiving device 12 may know that the employee goes inside or outside with respect to the entry/exit boundary 5 according to the moving direction of the employee, so as to modify the accumulated number of entry persons and/or the accumulated number of exit persons. Accordingly, the invention may filter out the employee, so as to calculate accurate number of customers.

Figure 5:
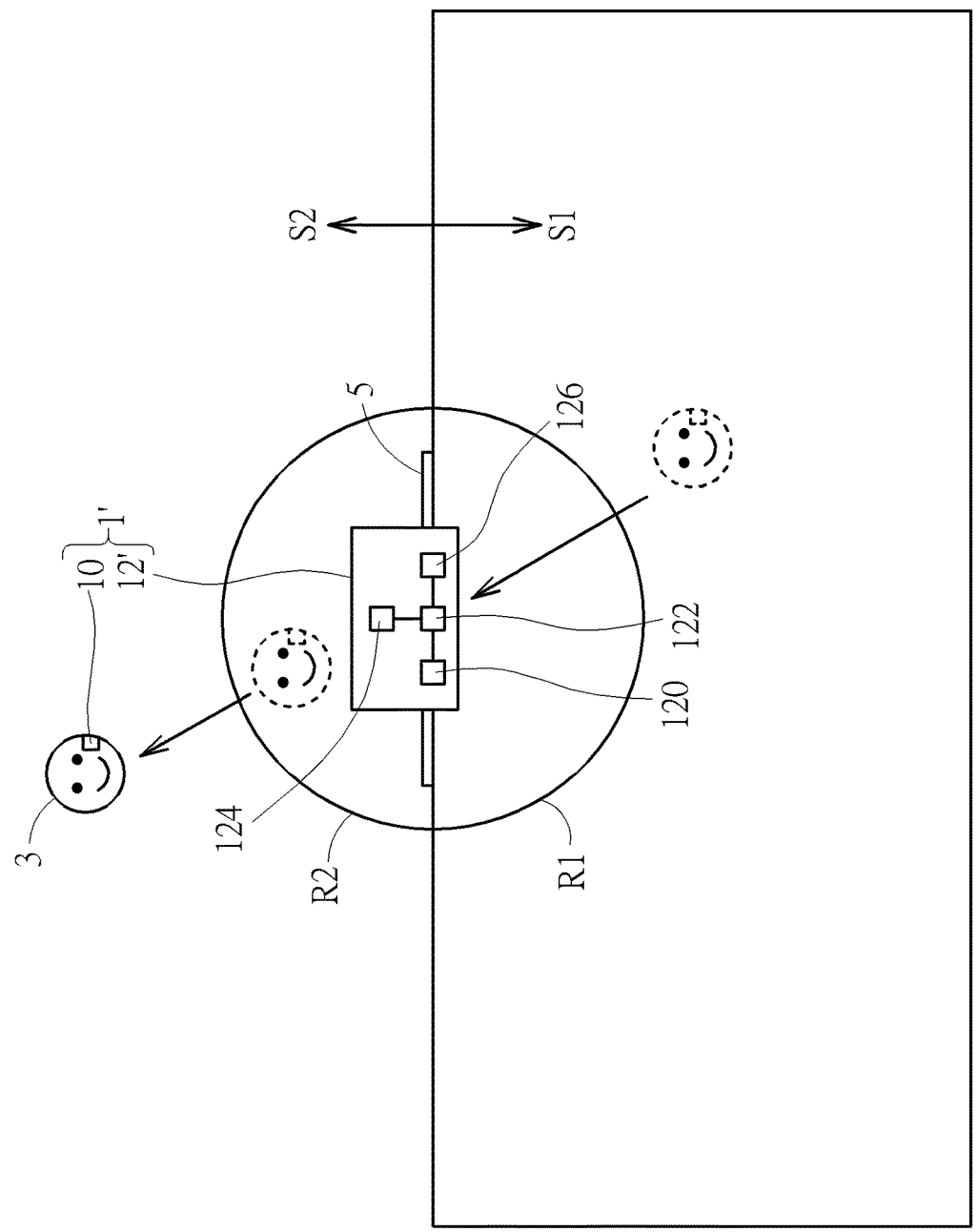
FIG. 5 is a schematic diagram illustrating a wireless transmitting/receiving system according to another embodiment of the invention, wherein the moving direction of the target object is to move from the first side of the entry/exit boundary towards the second side of the entry/exit boundary.
Figure 6:
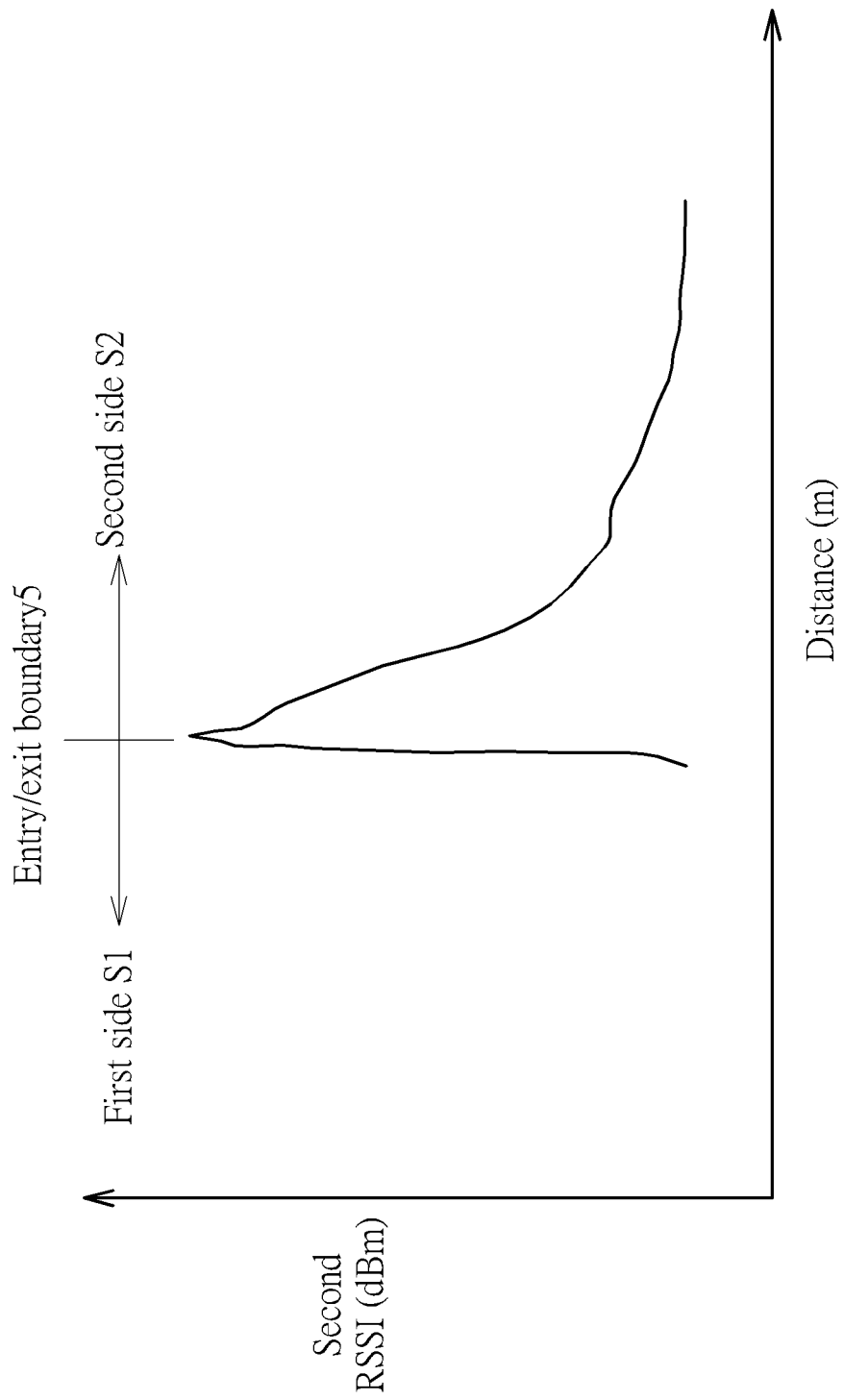
FIG. 6 is a diagram illustrating a relation between second received signal strength indications generated by the second directional receiver shown in FIG. 5 and distances.
Figure 7:
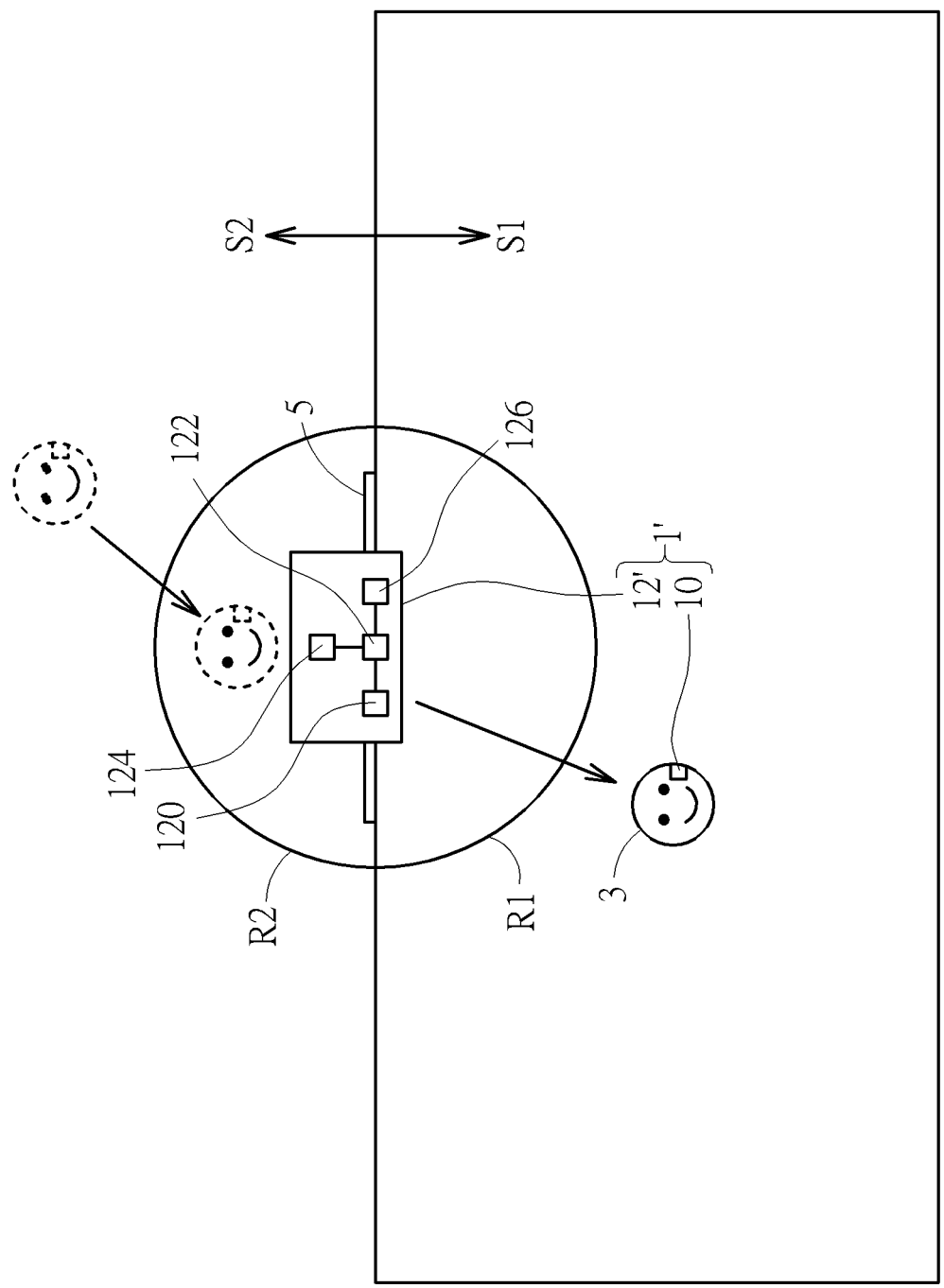
FIG. 7 is a schematic diagram illustrating that the moving direction of the target object shown in FIG. 5 is to move from the second side of the entry/exit boundary towards the first side of the entry/exit boundary.
Figure 8:
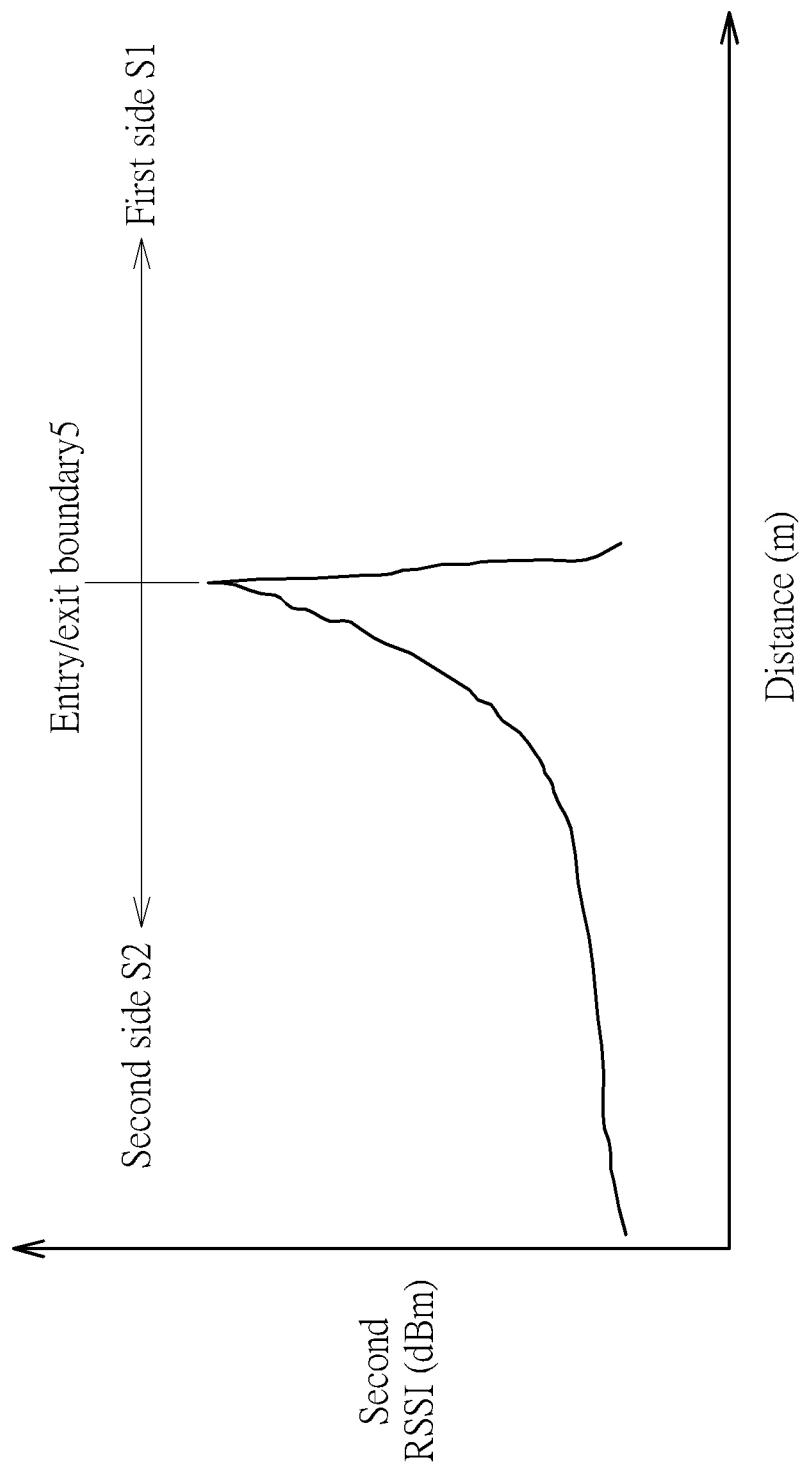
FIG. 8 is a diagram illustrating a relation between second received signal strength indications generated by the second directional receiver shown in FIG. 7 and distances.

Referring to FIGS. 5 to 8, FIG. 5 is a schematic diagram illustrating a wireless transmitting/receiving system 1' according to another embodiment of the invention, wherein the moving direction of the target object 3 is to move from the first side S1 of the entry/exit boundary 5 towards the second side S2 of the entry/exit boundary 5, FIG. 6 is a diagram illustrating a relation between second received signal strength indications generated by the second directional receiver 126 shown in FIG. 5 and distances, FIG. 7 is a schematic diagram illustrating that the moving direction of the target object 3 shown in FIG. 5 is to move from the second side S2 of the entry/exit boundary 5 towards the first side S1 of the entry/exit boundary 5, and FIG. 8 is a diagram illustrating a relation between second received signal strength indications generated by the second directional receiver 126 shown in FIG. 7 and distances.

The main difference between the wireless transmitting/receiving system 1' and the aforesaid wireless transmitting/receiving system 1 is that the wireless receiving device 12' of the wireless transmitting/receiving system 1' further comprises a second directional receiver 126 electrically connected to the processor 122, as shown in FIG. 5. Since the wireless receiving device 12' is disposed with respect to the entry/exit boundary 5 (e.g. the wireless receiving device 12' may be disposed above the entry/exit boundary 5), the second directional receiver 126 is also disposed with respect to the entry/exit boundary 5. It should be noted that the same elements in FIG. 5 and FIG. 1 are represented by the same numerals, so the repeated explanation will not be depicted herein again.

In this embodiment, the first directional receiver 120 may receive the wireless signal transmitted by the transmitter 10 and generate a first received signal strength indication continuously, and the second directional receiver 126 may also receive the wireless signal transmitted by the transmitter 10 and generate a second received signal strength indication continuously. Then, when the target object 3 moves with respect to the entry/exit boundary 5, the processor 122 may determine a moving direction of the target object 3 with respect to the entry/exit boundary 5 according to a variation of the first received signal strength indication and a variation of the second received signal strength indication. It should be noted that the principle of the first directional receiver 120 has been mentioned in the above, so the repeated explanation will not be depicted herein again.

As shown in FIG. 5, a second receiving range R2 of the second directional receiver 126 is oriented towards the second side S2 of the entry/exit boundary 5. When the moving direction of the target object 3 is to move from the first side S1 of the entry/exit boundary 5 towards the second side S2 of the entry/exit boundary 5 (e.g. move from inside towards outside), the relation between second received signal strength indications generated by the second directional receiver 126 and distances is shown in FIG. 6. When the target object 3 is about to pass through the entry/exit boundary 5 from the first side S1 of the entry/exit boundary 5, the second received signal strength indication increases rapidly. When the target object 3 gets away from the entry/exit boundary 5 gradually from the second side S2 of the entry/exit boundary 5, the second received signal strength indication decreases gradually. In other words, when the moving direction of the target object 3 is to move from the first side S1 of the entry/exit boundary 5 towards the second side S2 of the entry/exit boundary 5, the second received signal strength indication increases rapidly first and then decreases gradually. For example, the second received signal strength indication may increase with a third speed (e.g. increase with 2 dBm per second) and then decrease with a fourth speed (e.g. decrease with 1 dBm per second) smaller than the third speed. In an embodiment, the aforesaid third speed may be at least twice the aforesaid fourth speed.

On the other hand, as shown in FIG. 7, when the moving direction of the target object 3 is to move from the second side S2 of the entry/exit boundary 5 towards the first side S1 of the entry/exit boundary 5 (e.g. move from outside towards inside), the relation between second received signal strength indications generated by the second directional receiver 126 and distances is shown in FIG. 8. When the target object 3 gets close to the entry/exit boundary 5 gradually from the second side S2 of the entry/exit boundary 5, the second received signal strength indication increases gradually. When the target object 3 passes through the entry/exit boundary 5, the second received signal strength indication decreases rapidly. In other words, when the moving direction of the target object 3 is to move from the second side S2 of the entry/exit boundary 5 towards the first side S1 of the entry/exit boundary 5, the second received signal strength indication increases gradually first and then decreases rapidly. For example, the second received signal strength indication may increase with a first speed (e.g. increase with 1 dBm per second) and then decrease with a second speed (e.g. decrease with 2 dBm per second) larger than the first speed. In an embodiment, the aforesaid second speed may be at least twice the aforesaid first speed.

Accordingly, the processor 122 may determine that the target object 3 moves from the first side S1 of the entry/exit boundary 5 towards the second side S2 of the entry/exit boundary 5 (as shown in FIG. 5) when the first received signal strength indication increases gradually first and then decreases rapidly (as shown in FIG. 2) and when the second received signal strength indication increases rapidly first and then decreases gradually (as shown in FIG. 6). On the other hand, the processor 122 may determine that the target object 3 moves from the second side S2 of the entry/exit boundary 5 towards the first side S1 of the entry/exit boundary 5 (as shown in FIG. 7) when the first received signal strength indication increases rapidly first and then decreases gradually (as shown in FIG. 4) and when the second received signal strength indication increases gradually first and then decreases rapidly (as shown in FIG. 8).

By means of the variation of the aforesaid first received signal strength indication and the variation of the aforesaid second received signal strength indication, the processor 122 may determine the moving direction of the target object 3 with respect to the entry/exit boundary 5 easily. By means of the cooperation between the first directional receiver 120 and the second directional receiver 126, the invention may further enhance the accuracy of determining the moving direction of the target object 3 with respect to the entry/exit boundary 5. Furthermore, if there is a conflict between the variation of the first received signal strength indication and the variation of the second received signal strength indication (e.g. both increase gradually first and then decrease rapidly), the invention may measure a plurality of received signal strength indications received by the directional receiver when the object with the transmitter is located at a plurality of different locations by experiment in advance and establish a mapping table. Then, after the camera captures the image of the object and determines the location of the object, the invention may use the mapping table to find out a deserved received signal strength indication of the directional receiver corresponding to the location of the object and then calculate a difference between the deserved received signal strength indication and a real received signal strength indication. Then, the invention may determine that an object with the lowest difference is the target object after repeating the aforesaid calculation for several times.

Figure 9:
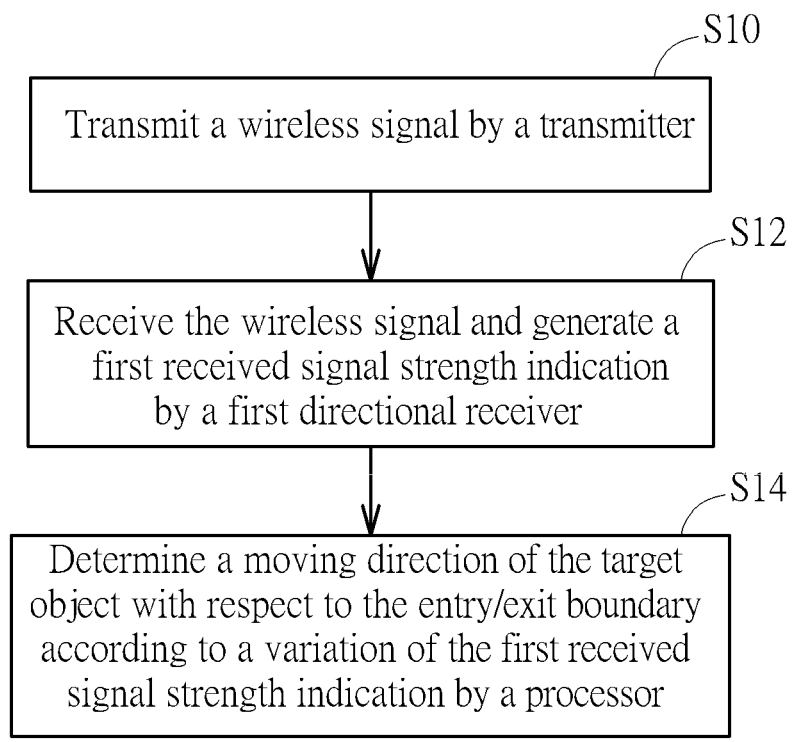
FIG. 9 is a flowchart illustrating a wireless transmitting/receiving method according to an embodiment of the invention.

Referring to FIG. 9, FIG. 9 is a flowchart illustrating a wireless transmitting/receiving method according to an embodiment of the invention. The wireless transmitting/receiving method shown in FIG. 9 may be implemented by the aforesaid wireless transmitting/receiving systems 1, 1'. First of all, step S10 is performed to transmit a wireless signal by a transmitter 10, wherein the transmitter 10 is disposed on a target object 3. Then, step S12 is performed to receive the wireless signal and generate a first received signal strength indication by a first directional receiver 120, wherein the first directional receiver 120 is disposed with respect to an entry/exit boundary 5 (e.g. disposed above the entry/exit boundary 5). Finally, step S14 is performed to determine a moving direction of the target object 3 with respect to the entry/exit boundary 5 according to a variation of the first received signal strength indication by a processor 122 when the target object 3 moves with respect to the entry/exit boundary 5. It should be noted that the detailed embodiments of the wireless transmitting/receiving method of the invention have been mentioned in the above, so the repeated explanation will not be depicted herein again. Furthermore, the wireless transmitting/receiving method shown in FIG. 9 may be implemented by software, hardware and/or the combination thereof.

Figure 10:
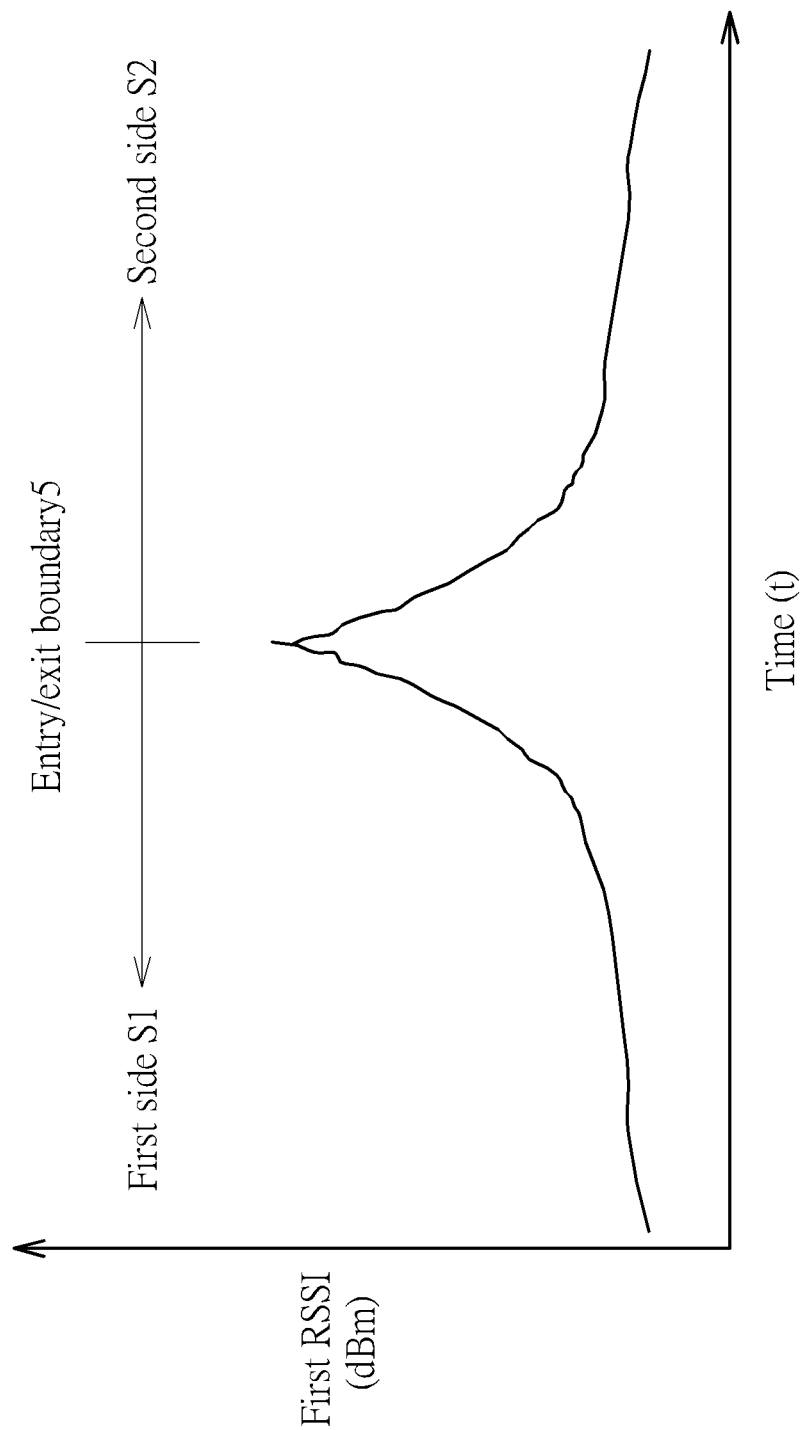
FIG. 10 is a diagram illustrating a relation between first received signal strength indications generated by the first directional receiver and time according to an embodiment of the invention.

In the aforesaid embodiments, the target object 3 has to move with respect to the entry/exit boundary 5 with a constant speed or about a constant speed (e.g. moves with 1.4 meters per second) and then the received signal strength indication received by the first directional receiver 120 increases or decreases gradually or rapidly accordingly, as mentioned in the above. If the target object 3 moves with respect to the entry/exit boundary 5 with an inconstant speed, the method or system of the aforesaid embodiments may not determine the moving direction of the target object 3 with respect to the entry/exit boundary 5 accurately. As shown in FIG. 1, the first receiving range R1 of the first directional receiver 120 is oriented towards the first side S1 of the entry/exit boundary 5. When the moving direction of the target object 3 is to move from the first side S1 of the entry/exit boundary 5 towards the second side S2 of the entry/exit boundary 5 (e.g. move from inside towards outside), the target object 3 may move towards the entry/exit boundary 5 with a faster speed first and then move away from the entry/exit boundary 5 with a slower speed after passing through the entry/exit boundary 5. At this time, a relation between first received signal strength indications generated by the first directional receiver 120 and time may be shown as FIG. 10, wherein the first side S1 of the entry/exit boundary 5 is opposite to the second side S2 of the entry/exit boundary 5. The processor 122 may not determine the moving direction of the target object 3 with respect to the entry/exit boundary 5 by the difference between increased speed and decreased speed of the first received signal strength indication.

Figure 11:
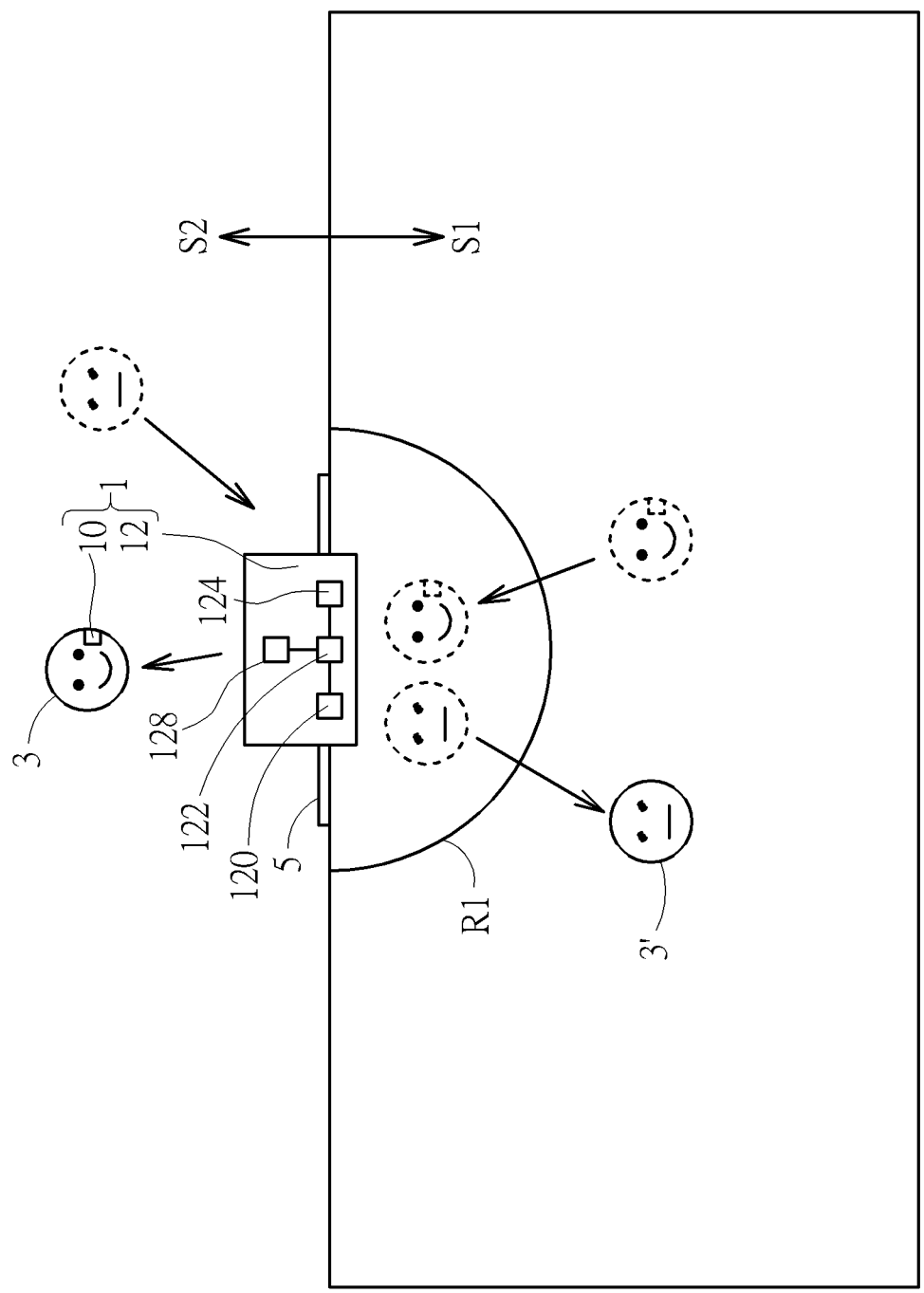
FIG. 11 is a schematic diagram illustrating a wireless transmitting/receiving system according to an embodiment of the invention, wherein the moving direction of the target object is to move with an inconstant speed from the first side of the entry/exit boundary towards the second side of the entry/exit boundary, and another object moves from the second side of the entry/exit boundary towards the first side of the entry/exit boundary.

As shown in FIG. 1, provided that the camera 124 captures the image of the entry/exit boundary 5 from top to down, e.g. the camera 124 captures the image with a person enters/exits a door from top to down. If only one person enters or exits within the environment shown in FIG. 1, the invention may determine the moving direction of the person with respect to the entry/exit boundary 5 by a sequence of images when the person appears in the image. Furthermore, the invention may determine whether the person in the environment carries the transmitter 10 according to whether the first directional receiver 120 receives a signal exceeding a specific strength, so as to recognize the person as an employee or a customer. However, provided that more than one person exists in the environment at the same time, wherein at least one person designated as the target object 3 carries the transmitter 10 and the moving speed thereof is not always constant or substantially constant. The moving direction of the target object 3 with respect to the entry/exit boundary 5 may not be determined accurately by the cooperation between the first directional receiver 120 and the camera 124. As shown in FIG. 11, the target object 3 moves with an inconstant speed from the first side S1 of the entry/exit boundary 5 towards the second side S2 of the entry/exit boundary 5, and another object 3' moves from the second side S2 of the entry/exit boundary 5 towards the first side S1 of the entry/exit boundary 5. The invention may determine there are two persons according to a sequence of images captured by the camera 124, wherein one person moves from the first side S1 of the entry/exit boundary 5 towards the second side S2 of the entry/exit boundary 5, and the other person moves from the second side S2 of the entry/exit boundary 5 towards the first side S1 of the entry/exit boundary 5. However, since the target object 3 moves with an inconstant speed, the invention may determine at least one of the two persons carries the transmitter 10 by the first directional receiver 120 but may not further determine which one carries the transmitter 10.

Figure 12:
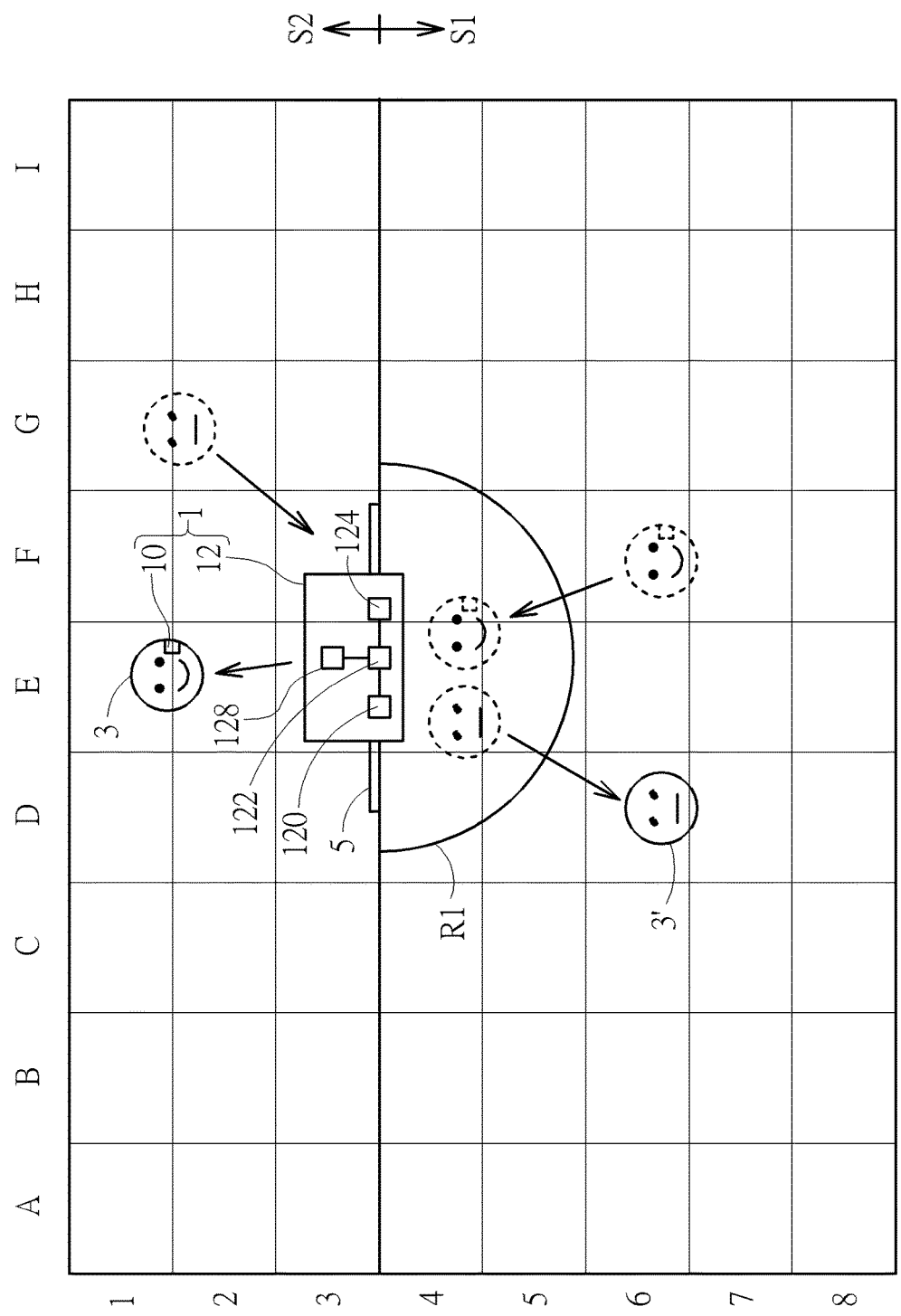
FIG. 12 is a schematic diagram illustrating a wireless transmitting/receiving system and a plurality of predefined locations according to an embodiment of the invention.

Therefore, in another embodiment, the invention may measure a plurality of received signal strength indications received by the directional receiver when an object with the transmitter 10 is located at a plurality of different locations within an environment by experiment in advance. For example, a tester may carry the transmitter 10 by a specific manner (e.g. the transmitter may be disposed on the middle of the chest) and then moves to a plurality of locations predefined in the environment. Then, the tester may stand and be oriented towards a plurality of orientations with respect to the entry/exit boundary 5 (e.g. face the entry/exit boundary 5 or back to the entry/exit boundary 5). Then, the invention may measure the received signal strength indication received by the first directional receiver 120 disposed with respect to the entry/exit boundary 5. As shown in FIG. 12, there are lots of rectangular areas shown in the figure, wherein the labels of columns are designated by 1 to 8, the labels of rows are designated by A to I, and the labels A1, B1, C1 to I8 are designated from upper left to lower right. A central point (e.g. centroid) of each rectangular area represents a location predefined in the environment.

When the wireless signal (e.g. Bluetooth signal) may be decayed by the human body, the received signal strength indication may be different due to the shielding effect of the human body even if the person is located at an identical location. For example, provided that the transmitter is disposed on the middle of the chest of the person, the received signal strength indication will be stronger when the person faces the receiver. On the other hand, the received signal strength indication will be weaker when the person turns his/her back to the receiver. To enhance the accuracy, the invention may establish a mapping table recording a plurality of received signal strength indications received by the first directional receiver 120 when the person with the transmitter 10 is located at a plurality of predefined locations and faces at least one predefined orientation. The mapping table may be stored in a storage device 128 (e.g. flash memory, but not so limited). The storage device 128 may be electrically connected to the processor 122, such that the processor 122 may access the mapping table. Then, after the camera 124 captures the image of the object, the processor 122 may determine the location and the orientation of the object in the environment through the image of the object, use the mapping table to find out a deserved received signal strength indication of the directional receiver corresponding to the location and the orientation of the object, calculate a difference between the deserved received signal strength indication and a real received signal strength indication, and then determine that an object with the lowest difference is the target object. To simplify the system, the invention may not limit the tester to a specific orientation when measuring and establishing the mapping table by experiment in advance. That is to say, the tester may stand and be oriented towards any orientation at each predefined location and the system records one received signal strength indication for each predefined location.

For example, as shown in FIG. 12, two objects 3, 3' are shown in the current image, wherein the object 3' is located at the location D6 and the object 3 is located at the location E1. In the mapping table, the deserved received signal strength indication, which is measured by experiment in advance, corresponding to the location D6 is −70 dBm and the deserved received signal strength indication, which is measured by experiment in advance, corresponding to the location E1 is −90 dBm. If the real received signal strength indication is −89 dBm, the processor 122 may determine the object located at the location E1 is the target object 3 with the transmitter 10 since −89 dBm is closer to −90 dBm rather than −70 dBm. After determining the locations of the target object 3 in different images captured at different time, the processor 122 may determine the moving direction of the target object 3 with respect to the entry/exit boundary 5. As shown in FIG. 12, if the processor 122 determines that the target object 3 is located at the locations F6, E4 and E1 in order, the processor 122 may determine that the target object 3 moves form the first side S1 of the entry/exit boundary 5 towards the second side S2 of the entry/exit boundary 5.

To enhance the accuracy, the invention may calculate the difference between the deserved received signal strength indication and the real received signal strength indication for several times and then determine that an object with the lowest difference is the target object.

For example, for each image of a sequence of images, the invention may calculate the difference between the deserved received signal strength indication, which is obtained by looking up the location of an object in the mapping table, and the real received signal strength indication, which is really received when the image is being captured, while the object appears in the beginning and disappears in the end from the sequence of images (i.e. life cycle). Then, the invention may calculate an averaged value for the differences and use the averaged value to determine whether the object is the target object 3 with the transmitter 10. If the object stays in the sequence of images for a long span of time, the accumulated difference may be large. Therefore, by means of calculating averaged difference of the object, the invention may avoid incorrect determination. Furthermore, the invention may select some images from the sequence of images rather than using all of the images to perform the aforesaid calculation. The manner of selecting how many images may be determined according to practical applications, so the invention is not limited to the aforesaid embodiment.

For another example, the invention may calculate the difference between the deserved received signal strength indication, which is obtained by looking up the location of each object in the corresponding image in the mapping table, and the real received signal strength indication while a signal appears in the beginning and disappears in the end from the receiver (i.e. life cycle). Then, the invention may calculate an averaged value for the differences and determine that an object with the lowest averaged value is the target object 3. Furthermore, the invention may select some images from the sequence of images rather than using all of the corresponding images to perform the aforesaid calculation. The manner of selecting how many images may be determined according to practical applications, so the invention is not limited to the aforesaid embodiment.

Moreover, the longer the distance between the target object 3 and the first directional receiver 120 is, the smaller the deserved received signal strength indication is and the smaller the real received signal strength indication is. Accordingly, it may be more unreliable to determine the location of the object by the signal difference since the ratio of the signal difference to the deserved received signal strength indication or the real received signal strength indication will be larger and the standard deviation of the signal difference will be larger. On the other hand, the shorter the distance between the target object 3 and the first directional receiver 120 is, the larger the deserved received signal strength indication is and the larger the real received signal strength indication is. Accordingly, it may be more reliable to determine the location of the object by the signal difference since the ratio of the signal difference to the deserved received signal strength indication or the real received signal strength indication will be smaller and the standard deviation of the signal difference will be smaller. Therefore, when calculating the aforesaid averaged value for the signal differences, the invention may further perform normalization according to the standard deviation of the signal difference corresponding to the location of the object. For example, the invention may divide each signal difference by the standard deviation of the signal difference corresponding to the location of the signal difference and then perform the aforesaid determination.

Still further, the camera 124 may capture an object X (e.g. a customer) without carrying the transmitter 10 at the first side S1 of the entry/exit boundary 5, and the target object 3 (e.g. an employee) with the transmitter 10 is located near the object X and beyond a field of view of the camera 124. After 60 minutes, the object X moves to the second side S2 of the entry/exit boundary 5 rapidly and away from the target object 3. After one more minute, the object X disappears from the field of view of the camera 124. If the invention performs the aforesaid determination for the object by using the signal differences corresponding to all of the images in the life cycle of the object, the object X may be mis-determined as the target object 3 since the data of the object X within the last one minute has to be averaged with the data of the object X within the prior 60 minutes. Accordingly, the invention may further calculate the averaged difference by time division. For example, the invention may calculate the averaged difference every one minute and filter out the object with the averaged difference obtained by time division larger than a predefined threshold local, so as to avoid mis-determining the object X as the target object 3. The calculation of the averaged difference by time division may cooperate with the aforesaid calculation of integral averaged difference. When performing determination, the invention may also filter out the object with the integral averaged difference larger than another predefined threshold global, so as to avoid mis-determination. The manner of calculating the averaged difference may be determined according to practical applications, so the invention is not limited to the aforesaid embodiment.

As mentioned in the above, the invention uses the directional receiver to receive the wireless signal transmitted by the transmitter and then determines the moving direction of the target object with respect to the entry/exit boundary according to the variation of the received signal strength indication. In practical applications, the invention may integrate the directional receiver and the camera into the wireless receiving device, dispose the wireless receiving device above the entry/exit boundary, and dispose the transmitter on an employee. Then, the camera may obtain an accumulated number of entry objects and/or an accumulated number of exit objects according to video analysis. Then, the wireless receiving device may know that the employee goes inside or outside with respect to the entry/exit boundary according to the moving direction of the employee, so as to modify the accumulated number of entry objects and/or the accumulated number of exit objects. Accordingly, the invention may filter out the employee, so as to calculate accurate number of customers. Since the invention may use one single directional receiver to determine the moving direction of the object, the invention may reduce the cost of installation and maintenance effectively. Furthermore, the invention may use two directional receivers cooperating with each other to further enhance the accuracy of determining the moving direction of the target object with respect to the entry/exit boundary. Still further, the invention may measure a plurality of received signal strength indications received by the directional receiver when the object with the transmitter is located at a plurality of different locations by experiment in advance and establish a mapping table. Then, after the camera captures the image of the object and determines the location of the object, the invention may use the mapping table to find out a deserved received signal strength indication of the directional receiver corresponding to the location of the object and then calculate a difference between the deserved received signal strength indication and a real received signal strength indication. Then, the invention may determine that an object with the lowest difference is the target object after repeating the aforesaid calculation for several times.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless transmitting/receiving system comprising:
    a transmitter disposed on a target object, the transmitter transmitting a wireless signal;
    a first directional receiver disposed with respect to an entry/exit boundary, the first directional receiver receiving the wireless signal and generating a first received signal strength indication;
    a camera capturing an image of the entry/exit boundary;
    a storage device storing a mapping table of target object location and received signal strength; and
    a processor electrically connected to the storage device, the processor determining a location of the target object and a moving direction of the target object with respect to the entry/exit boundary according to the image and the mapping table of target object location and received signal strength;
    wherein a first receiving range of the first directional receiver is oriented towards a first side of the entry/exit boundary; the processor determines that the target object moves from the first side of the entry/exit boundary towards a second side of the entry/exit boundary when the first received signal strength indication increases gradually first and then decreases rapidly; the processor determines that the target object moves from the second side of the entry/exit boundary towards the first side of the entry/exit boundary when the first received signal strength indication increases rapidly first and then decreases gradually; the first side is opposite to the second side.

2. The wireless transmitting/receiving system of claim 1, further comprising a second directional receiver disposed with respect to the entry/exit boundary; the second directional receiver receiving the wireless signal and generating a second received signal strength indication when the target object moves with respect to the entry/exit boundary; the processor determining the moving direction of the target object with respect to the entry/exit boundary according to a variation of the first received signal strength indication and a variation of the second received signal strength indication.

3. The wireless transmitting/receiving system of claim 2, wherein a first receiving range of the first directional receiver is oriented towards a first side of the entry/exit boundary and a second receiving range of the second directional receiver is oriented towards a second side of the entry/exit boundary; the processor determines that the target object moves from the first side of the entry/exit boundary towards the second side of the entry/exit boundary when the first received signal strength indication increases gradually first and then decreases rapidly and when the second received signal strength indication increases rapidly first and then decreases gradually; the processor determines that the target object moves from the second side of the entry/exit boundary towards the first side of the entry/exit boundary when the first received signal strength indication increases rapidly first and then decreases gradually and when the second received signal strength indication increases gradually first and then decreases rapidly; the first side is opposite to the second side.

4. The wireless transmitting/receiving system of claim 1, wherein the processor analyzes the image to obtain an accumulated number of entry objects and/or an accumulated number of exit objects, and the processor modifies the accumulated number of entry objects and/or the accumulated number of exit objects according to the moving direction of the target object with respect to the entry/exit boundary.

5. The wireless transmitting/receiving system of claim 4, wherein the first directional receiver, the processor and the camera are integrated into a wireless receiving device.

6. The wireless transmitting/receiving system of claim 1, wherein:
    the mapping table of target object location and received signal strength records a plurality of received signal strength indications received by the first directional receiver when the target object with the transmitter is located at a plurality of predefined locations and faces at least one predefined orientation; and
    the processor determines the location of the target object through the image, uses the mapping table of target object location and received signal strength to find out a deserved received signal strength indication of the first directional receiver corresponding to the location of the target object, calculates a difference between the deserved received signal strength indication and a real received signal strength indication of the first directional receiver, and determines the location of the target object.

7. A wireless receiving device disposed with respect to an entry/exit boundary, the wireless receiving device cooperating with a transmitter, the transmitter being disposed on a target object, the transmitter transmitting a wireless signal, the wireless receiving device comprising:
    a first directional receiver receiving the wireless signal and generating a first received signal strength indication;
    a camera capturing an image of the entry/exit boundary;
    a storage device storing a mapping table of target object location and received signal strength; and
    a processor electrically connected to the storage device, the processor determining a location of the target object and a moving direction of the target object with respect to the entry/exit boundary according to the image and the mapping table of target object location and received signal strength;
    wherein a first receiving range of the first directional receiver is oriented towards a first side of the entry/exit boundary; the processor determines that the target object moves from the first side of the entry/exit boundary towards a second side of the entry/exit boundary when the first received signal strength indication increases gradually first and then decreases rapidly; the processor determines that the target object moves from the second side of the entry/exit boundary towards the first side of the entry/exit boundary when the first received signal strength indication increases rapidly first and then decreases gradually; the first side is opposite to the second side.

8. The wireless receiving device of claim 7, further comprising a second directional receiver disposed with respect to the entry/exit boundary; the second directional receiver receiving the wireless signal and generating a second received signal strength indication when the target object moves with respect to the entry/exit boundary; the processor determining the moving direction of the target object with respect to the entry/exit boundary according to a variation of the first received signal strength indication and a variation of the second received signal strength indication.

9. The wireless receiving device of claim 8, wherein a first receiving range of the first directional receiver is oriented towards a first side of the entry/exit boundary and a second receiving range of the second directional receiver is oriented towards a second side of the entry/exit boundary; the processor determines that the target object moves from the first side of the entry/exit boundary towards the second side of the entry/exit boundary when the first received signal strength indication increases gradually first and then decreases rapidly and when the second received signal strength indication increases rapidly first and then decreases gradually; the processor determines that the target object moves from the second side of the entry/exit boundary towards the first side of the entry/exit boundary when the first received signal strength indication increases rapidly first and then decreases gradually and when the second received signal strength indication increases gradually first and then decreases rapidly; the first side is opposite to the second side.

10. The wireless receiving device of claim 7, wherein the processor analyzes the image to obtain an accumulated number of entry objects and/or an accumulated number of exit objects, and the processor modifies the accumulated number of entry objects and/or the accumulated number of exit objects according to the moving direction of the target object with respect to the entry/exit boundary.

11. The wireless receiving device of claim 7, wherein:
the mapping table of target object location and received signal strength records a plurality of received signal strength indications received by the first directional receiver when the target object with the transmitter is located at a plurality of predefined locations and faces at least one predefined orientation; and
the processor determines the location of the target object through the image, uses the mapping table of target object location and received signal strength to find out a deserved received signal strength indication of the first directional receiver corresponding to the location of the target object, calculates a difference between the deserved received signal strength indication and a real received signal strength indication of the first directional receiver, and determines the location of the target object.

12. A wireless transmitting/receiving method comprising steps of:
transmitting a wireless signal by a transmitter, wherein the transmitter is disposed on a target object;
receiving the wireless signal and generating a first received signal strength indication by a first directional receiver, wherein the first directional receiver is disposed with respect to an entry/exit boundary;
capturing an image of the entry/exit boundary by a camera; and
determining a location of the target object and a moving direction of the target object with respect to the entry/exit boundary according to the image and a mapping table of target object location and received signal strength by a processor;
wherein a first receiving range of the first directional receiver is oriented towards a first side of the entry/exit boundary and the wireless transmitting/receiving method further comprises steps of:
determining that the target object moves from the first side of the entry/exit boundary towards a second side of the entry/exit boundary by the processor when the first received signal strength indication increases gradually first and then decreases rapidly; and
determining that the target object moves from the second side of the entry/exit boundary towards the first side of the entry/exit boundary by the processor when the first received signal strength indication increases rapidly first and then decreases gradually;
wherein the first side is opposite to the second side.

13. The wireless transmitting/receiving method of claim 12, further comprising steps of:
receiving the wireless signal and generating a second received signal strength indication by a second directional receiver when the target object moves with respect to the entry/exit boundary, wherein the second directional receiver is disposed with respect to the entry/exit boundary; and
determining the moving direction of the target object with respect to the entry/exit boundary by the processor according to a variation of the first received signal strength indication and a variation of the second received signal strength indication.

14. The wireless transmitting/receiving method of claim 13, wherein a first receiving range of the first directional receiver is oriented towards a first side of the entry/exit boundary and a second receiving range of the second directional receiver is oriented towards a second side of the entry/exit boundary, the wireless transmitting/receiving method further comprises steps of:
determining that the target object moves from the first side of the entry/exit boundary towards the second side of the entry/exit boundary by the processor when the first received signal strength indication increases gradually first and then decreases rapidly and when the second received signal strength indication increases rapidly first and then decreases gradually; and
determining that the target object moves from the second side of the entry/exit boundary towards the first side of the entry/exit boundary by the processor when the first received signal strength indication increases rapidly first and then decreases gradually and when the second received signal strength indication increases gradually first and then decreases rapidly;
wherein the first side is opposite to the second side.

15. The wireless transmitting/receiving method of claim 12, further comprising steps of:
analyzing the image to obtain an accumulated number of entry objects and/or an accumulated number of exit objects by the processor; and modifying the accumulated number of entry objects and/or the accumulated number of exit objects by the processor according to the moving direction of the target object with respect to the entry/exit boundary.

16. The wireless transmitting/receiving method of claim 12, wherein the mapping table of target object location and received signal strength records a plurality of received signal strength indications received by the first directional receiver when the target object with the transmitter is located at a plurality of predefined locations and faces at least one predefined orientation, the wireless transmitting/receiving method further comprising steps of:

determining the location of the target object through the image by the processor;

using the mapping table of target object location and received signal strength to find out a deserved received signal strength indication of the first directional receiver corresponding to the location of the target object by the processor;

calculating a difference between the deserved received signal strength indication and a real received signal strength indication of the first directional receiver by the processor; and determining the location of the target object by the processor.

* * * * *